United States Patent Office 2,723,265
Patented Nov. 8, 1955

2,723,265

DOUBLY HINDERED DIISOCYANATES

Otto Stallmann, Bridgeton, N. J., assignor to E. I. du Pont de Nemours and Company, Wilmington, Del., a corporation of Delaware No Drawing. Application July 21, 1952,
Serial No. 300,129

5 Claims. (Cl. 260—239)

This invention relates to organic diisocyanates, and more particularly to isocyanates in which the isocyanate groups are hindered or blocked to render them relatively unreactive with most compounds having active hydrogen-containing functional groups below temperatures of about 85° C.

Recently diisocyanates have become of extreme commercial importance. Due to their chemical nature, however, they are very reactive generally with groups containing an active hydrogen such as —OH, —COOH, —NH₂ etc. In carrying out reactions with the isocyanates, extreme care must be exercised to prevent undesirable reactions by carefully controlling the various steps such as order of addition, temperature, presence of moisture and the like in order to avoid undesirable side reactions.

Heretofore many attempts have been made to reduce the activity of the diisocyanates by various means including blocking or hindering one of the —NCO groups. One such suggested method involves reacting the isocyanate group with a phenol or a compound containing methylene hydrogen such as a malonic ester to form adducts which regenerate the —NCO group on heating to about 150–180° C. Among the compounds which may be used to form adducts of diisocyanates are aceto-acetic ester; diethyl malonate; mercaptans such as 2-mercapto benzothiazole; lactams; imides such as succinimide, phthalimide and the like; tertiary amyl alcohol; dimethyl phenyl carbinol; and secondary amines such as diphenylamine. These adducts regenerate —NCO groups on heating to 100–150° C.

It is also well known that dimeric aromatic isocyanates such as the dimer of phenyl isocyanate regenerate the original isocyanate on heating to 150–180° C.

Both the adduct and dimer methods of forming blocked isocyanate groups require heating to a high temperature to free the isocyanate group. Unfortunately, this is frequently impossible due to various reasons such as the shape and dimensions of objects including them which preclude placing the objects in an oven, or due to the adverse effects on the objects by high temperatures. These requirements for the liberation of the —NCO group obviously place restrictions and inconvenience on their use.

It is therefore an object of the present invention to reduce the activity of organic diisocyanates at temperatures below about 85° C. Another object is the provision of doubly hindered —NCO groups in diisocyanates. A still further object of the present invention is the provision of a diisocyanate having lower alkyl groups on the carbons to which the —NCO groups are attached.

These and other objects are accomplished by compounds which have the following general formula:

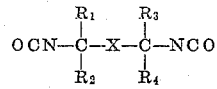

in which the R's are lower alkyl groups such as methyl, ethyl, propyl, etc. up to 8 carbon atoms. It is to be understood, however, that the two R's on either of the carbons may form with the carbon atom an alicyclic ring. The symbol X represents a bridging means which may be a group or single bond and is not critical per se, but represents a wide variety of forms, the following of which are representative in addition to the single chemical bond previously mentioned:

TABLE 1

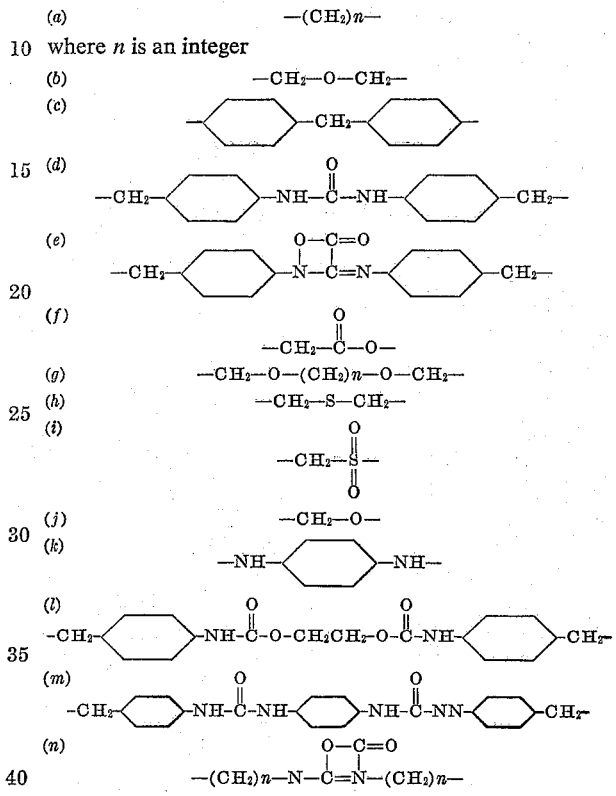

where n is a small integer.

These compounds may be prepared in a great variety of ways, some of which are illustrated in the examples. It will be apparent to those skilled in the art which to select to impart the desired characteristics in the final diisocyanate, as for example, solubility in a given solvent may be accomplished by the proper selection of the group represented by the symbol X. Likewise, if the compound is used to cross-link a low molecular weight polymer, the characteristics of the final product are determined by the bridging group X.

Two general methods of preparation of starting materials for the preparation of the diisocyanates of this invention are the method of Hass and Seigle described in J. Org. Chem. 5, 100–105 (1940), and its refinements reported in "Synthesis of Nitro Derivatives of Aliphatic Acids" by Donald E. Hudgin in a thesis presented at Purdue University on June 1, 1940. The dinitro compounds thus obtained may be converted to the diamines by a methanol-acetic acid-Raney nickel hydrogenation according to the method described in U. S. Patent No. 2,418,237, or preferably, the method of Bewad given in Ber. 39, 1233-4 (1906). The other general method gives the amine directly without going through the nitro derivative. This method of Ritter and Kalish in J. Am. Chem. Soc. 70, 4048 (1948) involves the reaction of tertiary alcohols with sodium cyanide in a mixture of acetic acid and sulfuric acid to give N-alkyl formamides which may be hydrolyzed with aqueous alkalies to give the desired tertiary carbinamines.

The phosgenation of the diamines is carried out in inert solvents in which the diamine dihydrochloride is at least partially soluble. The common solvents such as o-dichlorobenzene may be used in many cases. In the case of those diamines in which the amine-bearing carbons are separated by only a chemical bond or a lower alkylene group such as —CH₂— or —C₄H₈—, special solvents, such as tetramethylene sulfone, may be used as disclosed by Siefken in Annalen 562, 85, 97, 98 (1949). Mixtures of this with other solvents may also be used. Siefken also discloses a very useful method which involves the use of the carbonate of an amine which may be adopted to the preparation of the diisocyanates of this invention whose parent amine hydrochlorides are too difficultly soluble.

The following examples are typical of the diisocyanates falling within the scope of this invention:

(1) 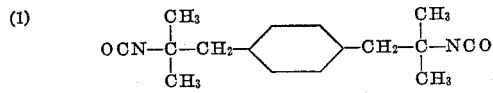

which may be prepared by reacting 1,4-di(chloromethyl) benzene with the sodium salt of 2-nitropropane, reducing to the corresponding diamine and phosgenating to obtain the diisocyanate or by the method of Ritter and Kalish from the corresponding dihydric alcohol;

(2) 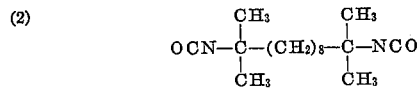

which may be prepared by the method of Ritter and Kalish from 1,1,-10,10-tetramethyldecamethylenediol followed by phosgenation of the diamine;

(3) 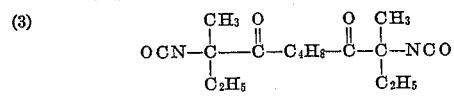

which may be prepared by reacting adipyl chloride with the sodium salt of 2-nitrobutane, reducing the dinitro compound to the diamine and phosgenating;

(4) 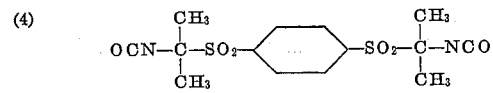

which may be prepared by reacting benzene-1,4-disulfonyl chloride with the sodium salt of 2-nitropropane, reducing the dinitro body to the diamine and phosgenating;

(5) 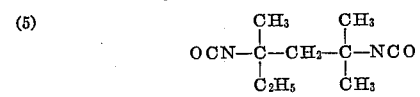

which may be prepared by reacting the sodium salt of 2-nitrobutane with 2-nitro-2-chloromethyl propane, reducing the dinitro-compound to the corresponding diamine and phosgenating;

(6) 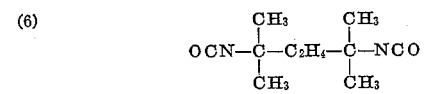

which may be prepared by reacting 2-nitropropane with ethylenedibromide according to Hudgin, supra, and then reducing the dinitro compound to the diamine by Bewad's method and phosgenating the diamine according to Siefken.

(7) 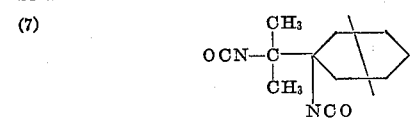

which may be prepared by reacting 2-bromo-2-nitropropane with the sodium salt of nitrocyclohexane as disclosed by Hass and Seigle followed by reduction of the dinitro compound and phosgenation in tetramethylene sulfone. Other methods of preparation are illustrated in the examples.

All of the organic diisocyanates prepared as indicated above are stable at ordinary temperatures, that is, in the range below 40° C., and may be dissolved in various solvents and mixed with most organic compounds without reaction, even though the latter contains active hydrogen atoms. The isocyanate groups may be activated without additions merely by warming the reactants to about 70–90° C. However, these diisocyanates react with very strongly basic amines, such as lower alkyl mono- and diamines up to a carbon chain of 4 at somewhat lower temperatures. The isocyanate group is relatively inactive toward —OH, —COOH, =NH, —NH₂ on more than 4 carbons, enolizable hydrogens and methylenic hydrogens as in malonic acid at temperatures below 40° C. and become active as the temperature increases to 70–90° C.

The following examples are given by way of illustration only, since it will be apparent that any diisocyanates having the above-mentioned bridging groups may be substituted in the examples for those shown with satisfactory results, although the properties of the ultimate products will be greatly influenced by the bridging group. It will also be apparent that while the examples show the —NCO groups attached to a tertiary carbon hindered or blocked by two methyl groups, the latter may be any alkyl group having up to 8 carbon atoms, or any two may form an alicyclic ring such as cyclohexyl.

*Example I*

50 parts of p-(2-aminoisobutyl) aniline, prepared according to J. A. C. S. 71, 2290 (1949), were dissolved in 1430 parts of o-dichlorobenzene and gassed with HCl at room temperatures until no more amine-dihydrochloride was formed, which required about 2 hours. The suspension of crystalline dihydrochloride was heated to 130° C., and 341 parts of phosgene were passed in while stirring at about 130–135° C. during the course of about 6 hours. A clear pale yellow solution resulted. Dry nitrogen was passed through to remove dissolved phosgene and the o-dichlorobenzene was distilled off under 8 mm. pressure. The crude residue was a pale brown oil. This was fractionated at 8 mm. pressure at 145–146° C. and the main fraction collected. The product was a water-white liquid of pleasant odor and analyzed 39.2% —NCO compared to a calculated value of 38.85 for a compound of the formula:

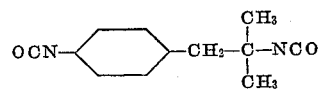

3 parts of the p-(2-isocyanato isobutyl) phenyl isocyanate were mixed with 0.1 part of phenyl dimethyl phosphine as a catalyst. After a few moments the liquid warmed up to about 40° C. and crystals began to form. At the end of about 2 hours the entire mass was solid. It was diluted with 4 parts of petroleum ether, filtered and the crystals were recrystallized from CCl₄. 2.8 parts of colorless crystals were obtained which melted at 168–169° C.

Infra-red and X-ray analysis showed the compound to contain the oxazetidine linkage proving the compound was a diisocyanate dimer of the formula:

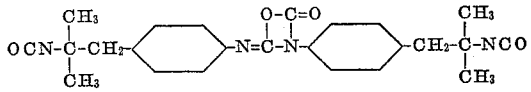

*Example II*

26 parts of p-(2-isocyanatoisobutyl) phenyl isocyanate were dissolved in 300 parts of dioxane and to it was added a solution of 5 parts of pyridine in 45 parts of water at 20° C. while stirring. It was stirred for 1½ hours at 20–27° C. The mass was then diluted with 200 parts of water and long crystalline needles separated out which, after stirring for 30 minutes at room temperature, were filtered off, washed with 1% hydrochloric acid and then washed acid-free with cold water and dried in vacuum oven at 50° C. 24 parts of white crystals were obtained. This was recrystallized from 270 parts of benzene and the white needle crystals melted at 180–181° C. The yield was 18 parts which is 74% of theory of the substituted urea of the formula:

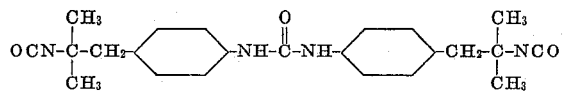

Analysis for —NCO was 20.04% compared to a calculated theory of 20.07%. Analysis for nitrogen showed 13.70% compared to a theory of 13.78%. The compound was soluble in chloroform, ethyl acetate, ethanol; insoluble in petroleum ether, CCl₄ or hexane.

*Example III*

To 5 parts of α-(1-isocyanatocyclohexyl)-p-tolylisocyanate (obtained by the phosgenation of alpha-(1-amino-cyclohexyl)-p-toluidine in the manner of Example I and having a boiling range of 168–169° C. at 3 mm. pressure and analyzing 33.0% —NCO as compared with a theory of 32.8%) was added 0.15 part of phenyldimethyl phosphine catalyst at room temperature to form the dimer. In a few moments crystals began to form and the entire mass was solid after standing overnight. The mass was slurried with 26 parts of petroleum ether and filtered to give 4.9 parts of white crystals which were recrystallized from 56 parts of benzene. 4.2 parts of beautiful rectangular plates were obtained which melted at 185–186° C. Infra-red and X-ray analysis showed both isocyanate and oxazetidine structures corresponding to the formula:

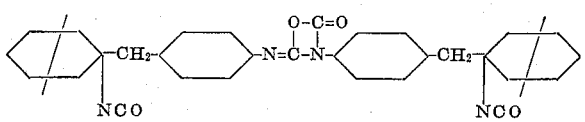

On heating for about 20 minutes above its melting point it reverted to the original diisocyanate.

*Example IV*

1 part of α-(1-isocyanatocyclohexyl)-p-tolylisocyanate was dissolved in 5 parts of dioxane and 0.15 part of a 1 N solution of sodium carbonate was added at room temperature. The solution was stirred and the temperature gradually increased to 40° and needle-like crystals began to separate. After 1 hour the crystals were filtered off, washed with petroleum ether and dried. 0.7 part of white crystals was obtained. The material was recrystallized from 10 parts of ethyl acetate to give long needle crystals melting at 185–186° C. The substituted urea so obtained,

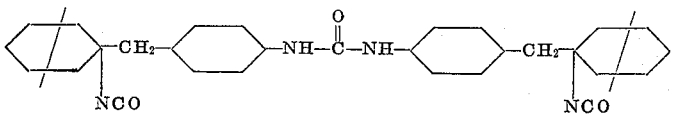

showed the presence of —NCO, =NH and urea groups by infra-red and X-ray analysis. This new diisocyanate analyzed (Dumas nitrogen) N=11.10%; theory N=11.51% for the compound represented by the above chemical formula (M. W. 486).

*Example V*

2,3-diamino-2,3-dimethylbutane dihydrochloride was prepared from 2-nitropropane and 2-bromo-2-nitropropane by the Hass and Seigle method followed by reduction with tin and hydrochloric acid. One part of the 2,3-diamino-2,3-dimethylbutane dihydrochloride was suspended in 7.5 parts of distilled tetramethylene sulfone and heated to 150–155° C. At this temperature an appreciable quantity of amine hydrochloride is dissolved. A slow stream of phosgene gas was then passed into the mixture for 3½ hours until a clear solution was obtained. Nitrogen was then blown through the solution to remove unreacted phosgene. The resulting diisocyanate was then distilled out of the solvent at 135° C. under a pressure of 25 mm. It is a colorless liquid of not unpleasant odor. Infra-red analysis shows the presence of —NCO groups corresponding to a compound of the following formula:

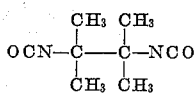

The products of the present invention fill a long-felt need in the use of organic diisocyanates. Many of the known diisocyanates lack at least one of the desired properties of those prepared according to the present invention. Among these may be mentioned lack of adequate solubility and excessive temperatures necessary for the regeneration of a blocked —NCO group. In the present invention, no extraneous material is left as in the case of the preparation of adducts mentioned above, and hence, there is no such material to be removed or retained in the product. One of the main advantages of the products of the present invention is that they have a very desirable reactivation temperature, whereas those of the prior art are only partially unreactive or react at temperatures only considerably above room temperature.

The present invention offers hindered diisocyanates which have sufficient flexibility so that activation of the —NCO groups under mild conditions may be obtained. The diisocyanates react when the temperatures are raised moderately above room temperature, usually from 70–90° C. It will be apparent, therefore, that it is not commercially possible to make a mixture of these diisocyanates with other reactive compounds and preform the mass in almost any desired manner, followed by reaction merely by warming gently.

A practical example is the preparation of lacquers and films which may be made from low molecular weight polyesters having terminal —OH groups dissolved in solvents together with the diisocyanates of the present invention. The solution may be applied to a surface as with conventional enamels, and after application the solvent may be evaporated and then heated to cause condensation between the isocyanate and hydroxyl groups. When compounds containing unhindered isocyanate groups are used, the reaction starts immediately on mixing the components, and within 2 or 3 hours the product has begun to gel and is unsuitable for coating.

The products of the present invention are also suitable as a basis of stable adhesives when used with polyfunctional compounds. Ordinary diisocyanate adhesives are stable for only 4 to 6 hours under the most favorable conditions, and usually the pot-life is from 1 to 3 hours. This requires making up fresh batches as necessary to be used within an hour or so. The diisocyanates of the present invention may be dissolved in suitable solvents and can be applied and stored for long periods of time. When it is desired to set the cement, this is accomplished merely by raising the temperature usually to about 85° C. as compared with 160° C. for prior art dimers.

The compounds of the present invention are also well adapted for making molded articles, since low or medium molecular weight polymers with reactive terminal groups may be mixed with the diisocyanates, shaped, and subsequently cured by subjecting the mass to about 80–100° C. under pressure instead of high temperatures of about 175–200° C. as usually required.

It will be apparent that many different embodiments of this invention may be made without departing from the spirit and scope thereof, and therefore, it is not intended to be limited except as indicated in the appended claims.

I claim:
1. A diisocyanate having the following formula:

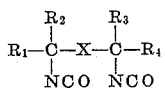

in which X is a bridging means and the R's are selected from the class consisting of lower alkyl radicals and parts of a cycloaliphatic radical attached to and included in the ring a single —NCO bearing carbon.

2. Compounds of claim 1 in which X is a single C—C bond.

3. Compounds of claim 1 in which X is —$(CH_2)n$—, where $n$ is an integer from 1 to 8.

4. Compounds of claim 1 in which X is

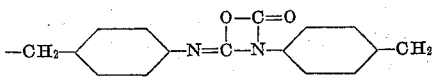

5. Compounds of claim 1 in which X is

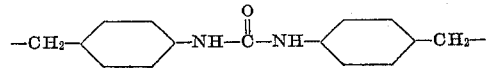

References Cited in the file of this patent

UNITED STATES PATENTS

| | | |
|---|---|---|
| 2,437,867 | Verbane | Mar. 16, 1948 |
| 2,620,349 | Slocombe | Dec. 2, 1952 |